INVENTORS
Olin H. Deyle
Donald Patterson
BY
THEIR ATTORNEY

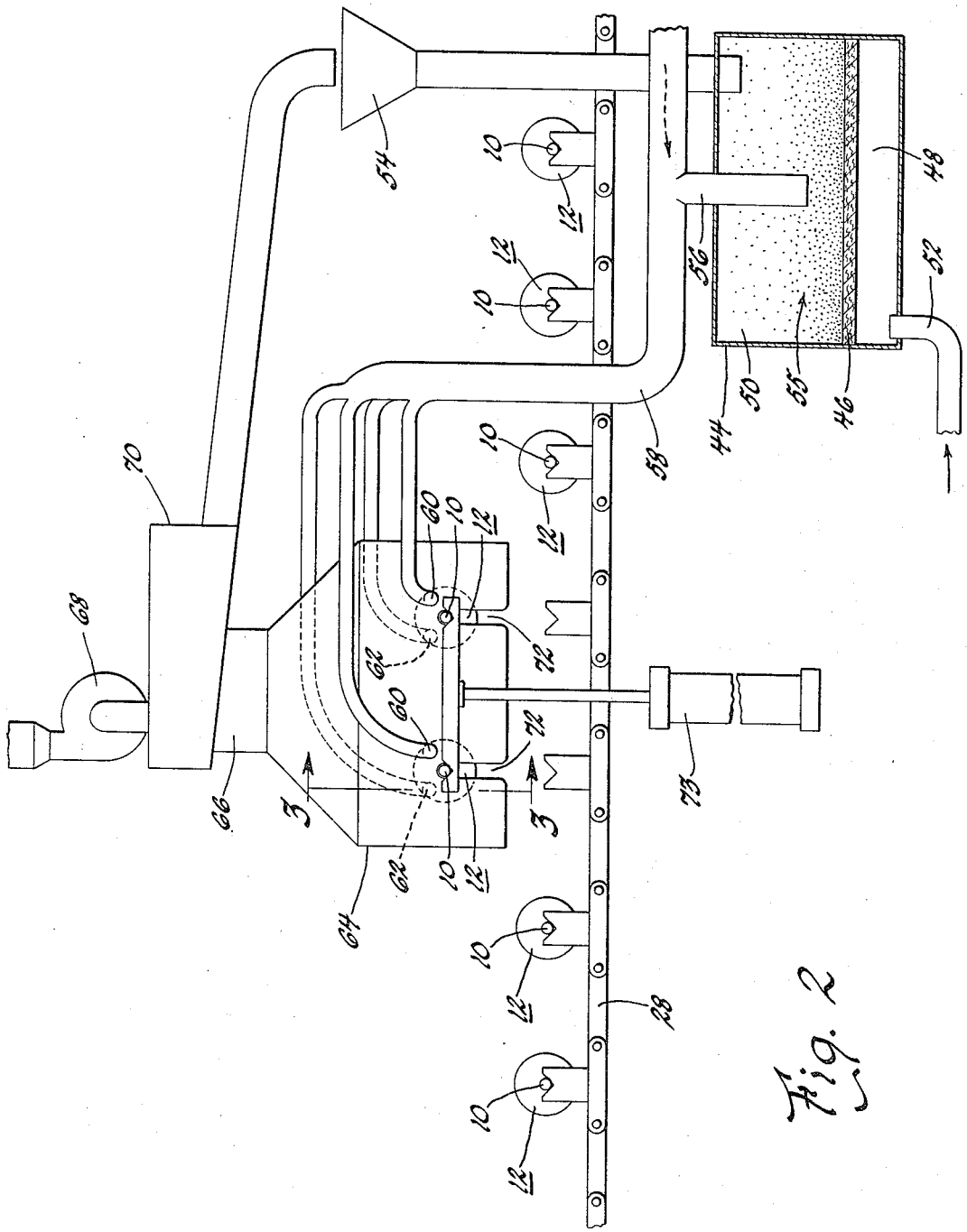

Dec. 13, 1966   O. H. DEYLE ETAL   3,291,630
METHOD OF COATING CYLINDRICAL ARTICLES
WITH THERMOPLASTIC MATERIAL
Filed July 21, 1961   3 Sheets-Sheet 3
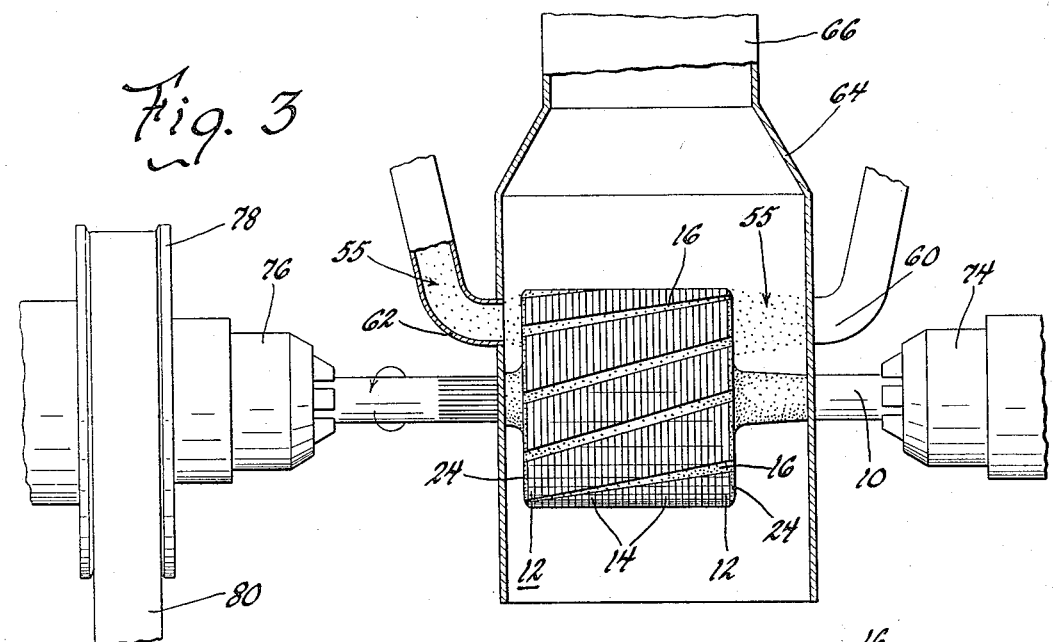
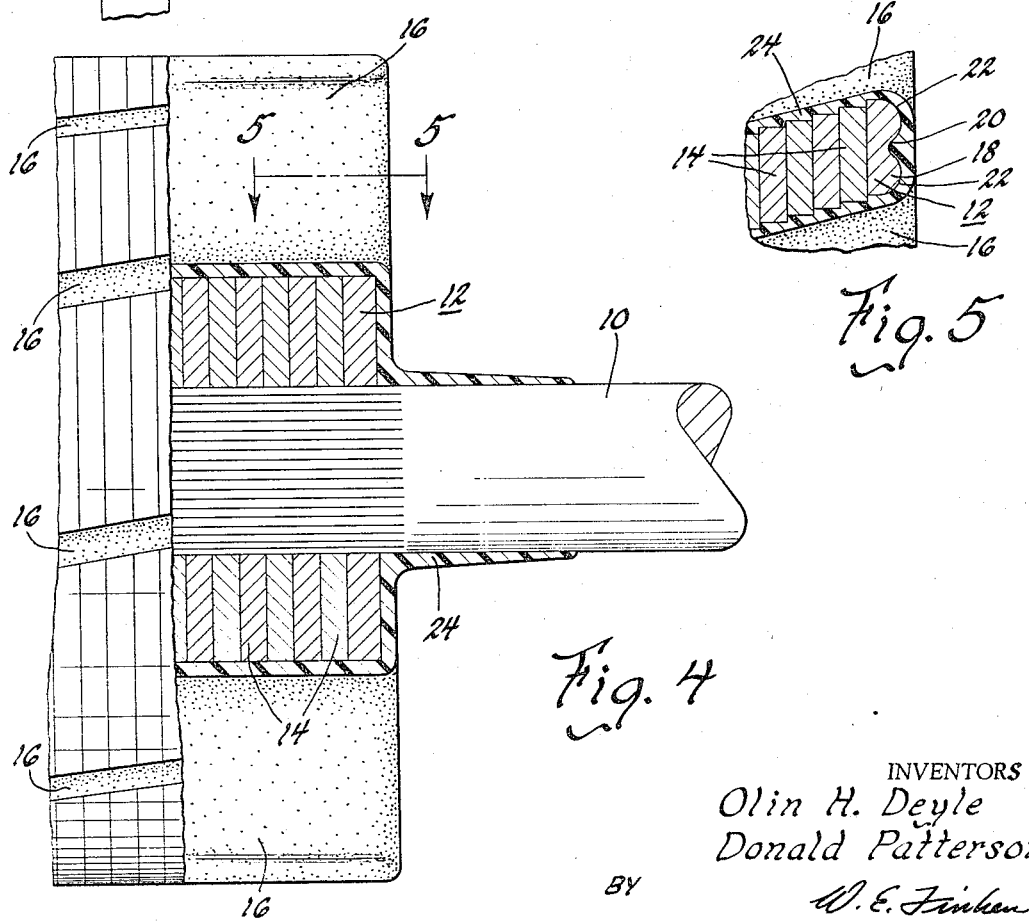
INVENTORS
Olin H. Deyle
Donald Patterson
BY
W. E. Finken
THEIR ATTORNEY

United States Patent Office 3,291,630
Patented Dec. 13, 1966

3,291,630
METHOD OF COATING CYLINDRICAL ARTICLES
WITH THERMOPLASTIC MATERIAL
Olin H. Deyle and Donald Patterson, Rochester, N.Y.,
assignors to General Motors Corporation, Detroit,
Mich., a corporation of Delaware
Filed July 21, 1961, Ser. No. 125,844
2 Claims. (Cl. 117—18)

This invention pertains to a method and apparatus for applying plastic coatings to articles, and particularly to a method and apparatus for applying plastic coatings to the end laminae and coil winding slots for an armature core.

Heretofore, numerous methods and apparatus have been tried in an effort to apply an insulating plastic coating on predesignated areas of an armature core, namely the outer surfaces of the end laminae and the coil winding slots, without coating the periphery of the core. In the prior methods and apparatus it was thought necessary to mask the outer periphery of the core so as to prevent the adherence of coating material thereon. Moreover, in prior methods and apparatus for applying plastic coating to articles it has been customary to immerse the entire article in a bed of fluidized plastic particles whereby the plastic particles will be deposited and adhere to all of the exposed surfaces of the article. The present invention contemplates the coating of the articles within a chamber which is exhausted by means of a suction fan, and wherein the fluidized particles are blown, or directed, at opposite ends of the article while the article is rotated in order to obtain the protective coating on the desired surfaces or on only selective areas, of the article while leaving other surfaces uncoated.

Accordingly, among our objects are the provision of an improved method and apparatus for coating articles with fluidized plastic particles; the further provision of an improved method and apparatus for coating the end laminae and coil winding slots of an armature core with a layer of plastic; and the still further provision of an improved method and apparatus for conveying fluidized plastic particles from a fluidized bed and blowing the fluidized plastic particles at an article to be coated while the article is rotated in a chamber which is exhausted by a suction fan to remove excess plastic particles suspended in the air.

The aforementioned and other objects are accomplished in the present invention by locating the armature cores within an exhaust hood; rotating the cores about their horizontal axes and simultaneously directing fluidized plastic particles at opposite ends of said core through a pair of offset nozzles. Specifically, the coating method comprises the steps of initially cleaning the armature cores to remove grease and other foreign material; heating the armature cores to a temperature above the melting point of the thermoplastic particulate coating material; applying the coating material; reheating the armature cores to homogenize the coating material; and thereafter cooling the armature cores to cure or set the coating. For mass production purposes, the apparatus may take the form of a conveyor upon which the uncoated armature cores are loaded; the conveyer passing through a cleaning chamber and then through a preheat oven to a coating station. At the coating station two cores are simultaneously removed from the conveyer and positioned within the exhaust hood whereat chucks engage the armature core shafts to rotate the same. The fluidized plastic particles are blown through offset nozzles at opposite ends of the core so as to coat the surfaces of the end laminae, portions of the armature shaft, and the coil winding slots. The coated armature cores are then returned to the conveyer which passes through a postheating oven and a cooling tunnel to an unloading station where the coated armature cores are removed from the conveyer.

The apparatus also includes a fluidized bed comprising a tank having a diffuser plate, or porous partition dividing it into two chambers, the upper of which contains finely divided particles of thermoplastic resin, such as epoxy, and the lower chamber of which is subjected to air under pressure. The air passes through the diffuser plate and produces a cloud, or suspension, of fluidized plastic particles in the upper chamber which are drawn off through an aspirating tube and supplied to the nozzles by air under pressure. The excess plastic particles within the exhaust hood are collected and may thereafter be returned to the fluidized bed through a supply hopper. It has been found that by directing the fluidized particles at the armature core through nozzles while the armature cores rotate within an exhaust hood, the outer peripheries of the armature cores have no coating deposited thereon.

Further objects and advantages of the present invention will be apparent from the following description, reference being had to the accompanying drawings, wherein a preferred embodiment of the present invention is clearly shown.

In the drawings:

FIGURE 2 is a schematic view of the apparatus for applying the coating material.

FIGURE 3 is an enlarged view taken along line 3—3 of FIGURE 2 through an exhaust hood, partly in section and partly in elevation.

FIGURE 4 is an enlarged fragmentary view, partly in section and partly in elevation, of an armature core with a coating applied thereto.

FIGURE 5 is a fragmentary sectional view taken along line 5—5 of FIGURE 4.

Figure 1:
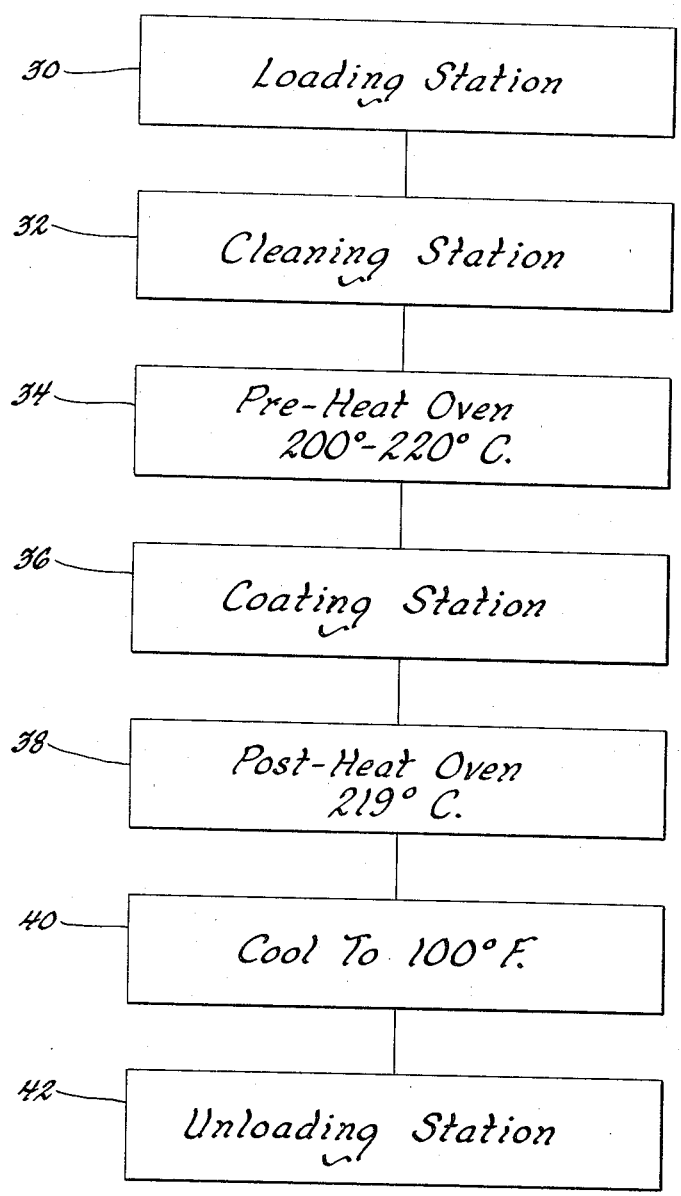
FIGURE 1 is a block diagram of the coating method.

With reference to FIGURES 3 and 4, the article to be coated in accordance with the method and apparatus of this invention comprises an armature core having a shaft 10 with a stack of laminae press fitted thereon. The stack comprises end laminae 12 and intermediate laminae 14. Each laminae is formed with a plurality of circumferentially spaced coil winding slots 16, and as shown the laminae are arranged so that the coil winding slots are skewed from one end of the stack to the other. However, it is to be understood that the method and apparatus of this invention can also be used to apply insulating plastic coatings to armature cores wherein the coil winding slots extend axially through the stack of laminae.

As shown in FIGURE 5 each end lamina 12 of the stack has embossed teeth 18 which define the spaced slots 16, the teeth 18 having a central depression 20 and curved edges 22 which are formed by a coining operation to assure adherence of the coating material to the edges defining the coil winding slots. As shown in FIGURE 4, the end surfaces of the end laminae 12, portions of the shaft 10 and the edges, or walls, of the coil winding slots 16 are coated with a layer of insulating plastic material 24 such that when the armature coils are wound in the slots 16 they will be insulated from the armature stack. The coating material may comprise any suitable thermoplastic such as polyethylene, epoxies or polystyrene, although epoxy resins are preferred. Moreover, while the layer of coating material may be of various thickness on the portions of the armature shaft 10 and the end surfaces of the end laminae 12, a substantially uniform coating of a thickness of between .007 and .010 inch is desired on the walls of the coil winding slots 16.

Referring to FIGURE 1, the instant coating method is designed to be carried out in a continuous manner and thus the apparatus includes a conveyer for moving the armature cores through successive stations. Thus, the armature cores are loaded on a conveyer at a loading station 30 from which they pass to a cleaning station 32 whereat grease and other foreign material is removed from the cores by washing the same in a suitable solvent. After the armature cores have been cleaned they pass through a preheat oven 34 wherein the cores are heated to a temperature above the melting point of a finely divided plastic coating material. With epoxy powder the armature cores are heated to a temperature of between 200 and 220° C. The heated cores are then conveyed to a coating station 36 which will be described in detail hereinafter. At the coating station 36 two cores are simultaneously removed from the conveyer and the end surfaces of the laminae of each coil winding slots are coated with fluidized plastic particles, after which the cores are returned to the conveyer. The armature cores then pass through a post heat oven 38 which is maintained at a temperature of approximately 219° C. whereat the coating becomes homogenized and uniformly bonded to the surfaces of the armature cores. Thereafter the coated armature cores pass through a cooling tunnel 40 where the temperature thereof is reduced to approximately 100° F. after which they are moved to the unloading station 42 where they are removed from the conveyer.

With reference to FIGURE 2, the apparatus for coating the armature cores comprises a closed tank 44 constituting a fluidized bed and having a diffuser plate, or porous partition, 46 dividing the tank into a lower chamber 48 and an upper chamber 50. The lower chamber 48 is connected to a source of air or other gas under pressure supplied through a conduit 52, the pressure being 3 to 10 p.s.i. of the area of the bed. The upper chamber 50 contains a quantity of finely divided epoxy resin powder which is supplied from a hopper 54. The partition 46 is pervious to air but is impervious to the particles of coating material. The air passing through the diffuser plate 46 produces a cloud or suspension of plastic particles 25, hereinafter called a fluidized bed, in the upper chamber 50 of the tank.

The open end of an aspirating tube 56 is disposed within the upper chamber 50 of the tank 44, the aspirating tube being connected to a conduit 58 through which air is supplied under pressure, for example 90 p.s.i. The air flowing through the conduit 58 will aspirate the fluidized plastic particles 55 from the upper chamber 50 of the tank, and these particles will be carried by the moving air stream in the conduit 58 to nozzles 60 and 62. The stream of fluidized particles in the conduit 58 is divided into four portions as seen in FIGURE 3 to supply the four nozzles. Two nozzles 60 are supported at one side of the exhaust hood 64, and two nozzles 62 are supported on an opposite side of the exhaust hood 64. Moreover, each pair of oppositely directed nozzles 60 and 62 are offset with respect to each other as clearly shown in FIGURE 2.

The exhaust hood 64 is connected by a duct 66 to the inlet side of an exhaust or suction fan 68, a suitable plastic powder collector 70 being disposed between the inlet of the fan 68 and the duct 66. Accordingly, the hood 64 will be partially evacuated, or under subatmospheric pressure, when the suction fan or blower 68 is operating. The excess plastic particles are thus removed from the space within the exhaust hood 64 and remain in the collector 70 which can be periodically unloaded into the hopper 54 so as to return the plastic particles to the fluidized bed.

Opposite ends of the hood 64 are formed with slots 72 for receiving the shafts 10 of the armature cores. Two armature cores are simultaneously removed from the conveyer 23 by an air operated actuator 73, and as seen in FIGURE 3, engaged by rotatable chucks 74 and 76 outside of the exhaust hood 64. The chuck 76 is shown connected to a pulley 78 which is rotated by a belt 80 by any suitable means such as an electric motor whereby the armature cores are rotated within the exhaust hood 64 at approximately 50 r.p.m. Each pair of nozzles 60 and 62 direct, or blow, the fluidized plastic particles at opposite sides of the cores so as to coat the end surfaces of the end laminae 12 and the edges, or walls, of the coil winding slots 16. In order to obtain the desired coating thickness on the edges of the coil winding slots, the fluidized plastic particles are blown simultaneously at both ends of the cores from the offset nozzles 60 and 62 for an interval of approximately seven seconds while the armature core is rotated at approximately 50 r.p.m. Thus it will be appreciated that the armature core makes several revolutions during the coating operation. The fluidized coating material is only discharged from the nozzles when the armature cores are positioned within the hood, as controlled by a suitable cut-off valve, not shown, in the conduit 58.

During the coating operation the blower 68 is continuously operated to remove the excess plastic particles from the space within the hood 64. By removing the excess plastic particles, the outer periphery of the armature cores remains uncoated even though the outer periphery is unmasked. This is due primarily to the fact that the fluidized plastic particles are directed by the nozzles at the end surfaces of the core and through the coil winding slots.

After the coating operation the armature cores are disengaged from the chucks 74 and 76 and returned to the conveyer so as to pass through the postheat oven 38 and the cooling tunnel 40 to the unloading station 42. Thereafter, a second pair of armature cores are moved to the coating station and coated in the manner aforedescribed.

While the embodiment of the invention as herein disclosed constitutes a preferred form, it is to be understood that other forms might be adopted.

What is claimed is as follows:

1. The method of coating the end surfaces of a cylindrical article with a coating of thermoplastic material wherein the article is heated to a temperature above the melting point of the plastic coating material comprising the steps of, forming a suspension of particles of the thermoplastic coating material in a gaseous stream, dividing said stream into at least two portions, directing the streams in opposite directions axially against opposed end surfaces of said cylindrical article with the article disposed within a chamber, effecting relative rotation between said oppositely directed streams and said article to coat the end surfaces thereof, and removing the excess coating particles surrounding the article within the chamber by exhausting the air therefrom so as to prevent coating the outer periphery of said cylindrical article.

2. The method of coating predesignated surfaces of a cylindrical article having slots extending therethrough from end to end and opening to the periphery thereof wherein the predesignated surfaces comprise the walls of said slots and the end surfaces of said cylindrical article, and wherein the article is heated to a temperature above the melting point of the coating material to be applied, comprising the steps of, forming a suspension of particles of the coating material in a gaseous stream, dividing said stream into at least two portions, directing the streams in offset relation and in opposite directions axially against the end surfaces of said cylindrical article and through the slots thereof while the article is disposed within a chamber, effecting relative rotation between the article and said streams, and removing the excess particles surrounding the article within the chamber by exhausting air therefrom to prevent coating of the periphery of said cylindrical article.

References Cited by the Examiner
UNITED STATES PATENTS

| | | | |
|---|---|---|---|
| 2,169,078 | 8/1939 | Waite | 117—19 X |
| 2,572,515 | 10/1951 | Poole et al. | 117—43 |
| 2,758,564 | 8/1956 | Randall | 118—309 |
| 2,907,299 | 10/1959 | Weiner | 118—309 |
| 2,919,160 | 12/1959 | Blackburn | 302—57 |
| 3,093,510 | 6/1963 | Olson et al. | 117—21 X |

OTHER REFERENCES

Gemmer, E.: "Das Wirbelsinterverfahren-Grundlagen, Verfahren und Geräte," Plastverarbeiter, September 1956, pp. 342–348.

Gemmer, E.: "Das Wirbelsintern-Entwicklungen und neuere Erkenntnisse," Kunststoffe Bd. 47, Heft 8 (1957), pages 510–512.

WILLIAM D. MARTIN, *Primary Examiner.*

RICHARD D. NEVIUS, V. E. SULLIVAN, H. W. MYLIUS, *Assistant Examiners.*